Dec. 19, 1967  E. L. SCHAUB  3,359,017
PIPE COUPLING OF CORRUGATED SHIELD TYPE
Filed March 1, 1967  2 Sheets-Sheet 1

INVENTOR
ERWIN L. SCHAUB
BY
ATTORNEY

Dec. 19, 1967   E. L. SCHAUB   3,359,017
PIPE COUPLING OF CORRUGATED SHIELD TYPE
Filed March 1, 1967   2 Sheets-Sheet 2

INVENTOR
ERWIN L. SCHAUB
BY
Albert C. Johnston
ATTORNEY

United States Patent Office 3,359,017
Patented Dec. 19, 1967

3,359,017
PIPE COUPLING OF CORRUGATED SHIELD TYPE
Erwin L. Schaub, Middle Village, N.Y., assignor to Ideal Corporation, Brooklyn, N.Y., a corporation of New York
Filed Mar. 1, 1967, Ser. No. 619,660
5 Claims. (Cl. 285—236)

ABSTRACT OF THE DISCLOSURE

A pipe coupling of the type comprising a corrugated sheet metal shield contracted by encircling clamp bands, with the shield ends overlapping, about an annular elastic gasket fitted over adjacent pipe ends is made to give more reliable sealing and greater sealing pressure by leading the lapping shield end in the direction of contraction of the band portions engaging it, making the lapped shield end flat and merging into a tapered shield portion formed by corrugations of progressively increasing height, and tapering corrugations of the lapping shield end oppositely in the areas engaged by the band.

---

This invention relates to improvements in pipe couplings of the type in which an annular elastic gasket fitting over the adjacent ends of pipe sections to be joined together is encircled by a corrugated sheet metal shield that can be contracted so as to compress the gasket against the pipe ends by tightening clamping bands which extend around the shield at axially spaced locations thereon. Certain pipe couplings of this type are disclosed in U.S. Patent No. 3,233,922 of Gordon Evans issued Feb. 8, 1966.

Known coupling devices of the type mentioned have enabled sections of cast iron soil pipe, or the like, to be joined quickly, and securely for some purposes, where the pipe is of about 3 inches or smaller in diameter. On the other hand, the known coupling constructions have not given satisfactory seals in various uses such, for example, as when made for use on larger pipes of about 4 inches or more in diameter.

It has now been found that there are two basic causes for such deficiencies of the known coupling constructions and that they can be overcome by the improvements herein set forth. The invention thus provides improved pipe couplings of the described type which are more reliable in their sealing qualities and require less tightening force for effectively coupling pipes of any given size and are useful in considerably larger sizes than the similar couplings heretofore known.

One of the causes found for such deficiencies is that, in the region of overlap of ends of the shield encircling the gasket, the shield corrugations interlock as the clamping bands are tightened and form a relatively rigid segment which upon further tightening of the bands absorbs much of their tension as a tangential compressive load. The proportion of the band tension acting radially as a pressure to seal the gasket thus is limited so that at a safe torque loading of band tightening devices the radial pressure attained is not sufficient to assure a reliable seal for various purposes, such as the coupling of larger pipes.

Another cause found for the deficiencies in said known coupling constructions is that, by reason of the fact that the lapping end of the shield leads over the lapped end thereof in the direction opposite to the direction of contraction of portions of the bands which bear against said lapping end, the tightening of the bands is attended by relative circumferential movements of four confined surfaces and, therefore, by large components of frictional resistance which increase as the bands become tighter and severely limit the pressure applied to the gasket. A large part of the resistance has been found due to tightening forces which try to move both the lapped shield end and said band portions in a direction opposite to the direction of displacement of the lapping shield end sandwiched in between.

According to one feature of the invention, an improved pipe coupling of the described type is provided wherein the lapping end of the corrugated shield leads over the lapped end thereof in the direction of the circumferential displacement imparted to the portions of the clamping bands engaging the lapping end of the shield during the circumferential contraction of the bands and the sleeve by the tightenable means of the bands. By reason of this "reverse overlap" arrangement, the contraction of the shield so that it will compress and seal the gasket against the pipe ends being joined is attended by opposing relative sliding movements between only two, rather than four, of the contracting band and shield surfaces and there is a great reduction of the frictional resistance of those surfaces to the required contraction of the shield upon the gasket on the pipe ends.

According to another feature of the invention, the lapped end of the shield is made substantially flat, that is, it is uncorrugated and even or smooth on both sides and extends for a considerable distance from the adjacent end edge of the siheld, for example, for about 2½ inches therefrom in the case of a coupling made for pipes of 4-inch outside diameter. In this way, the tendency of the overlapping shield ends to interlock and strongly resist the final contraction and sealing of the coupling can be effectively overcome.

According to a further feature of the invention, such a substantially flat lapped shield end is connected with the body of the shield through a tapered portion of the shield formed by corrugations of progressively increasing height, and the lapping end of the shield is oppositely tapered by corrugations of progressively diminishing height in the areas thereof engaged by the clamping bands. The contraction of the shield in the course of tightening of the bands brings the tapered lapping end over the flat lapped end of the shield, and the tapered form of the lapping end and of the portion of the shield connecting the lapped end with the shield body gives a gradual transition in thickness which avoids troublesome differences of shield thickness at adjacent circumferential locations and enables the radial sealing pressure produced on the gasket by the contraction of the bands to be distributed substantially evenly about the gasket.

In some uses of the improved coupling the presence of very shallow corrugations along the entire edge of the lapping end of the shield would enable the shield to be buckled outward near that edge in the region between the clamping bands due to the outward pressure exerted there by the gasket when it is under heavy radial compression at the locations of the bands. It has been found that this buckling condition can be avoided by forming that part of the lapping shield end which lies between the areas thereof engaged by the bands with corrugations of substantially the same height, hence of substantially the same resistance to transverse bending forces, as the corrugations which form the body of the shield.

The above, and other objects, features and advantages of the invention, will be apparent in the following detailed description of an illustrative embodiment thereof which is to be read in connection with the accompanying drawings, wherein.

Figure 1:
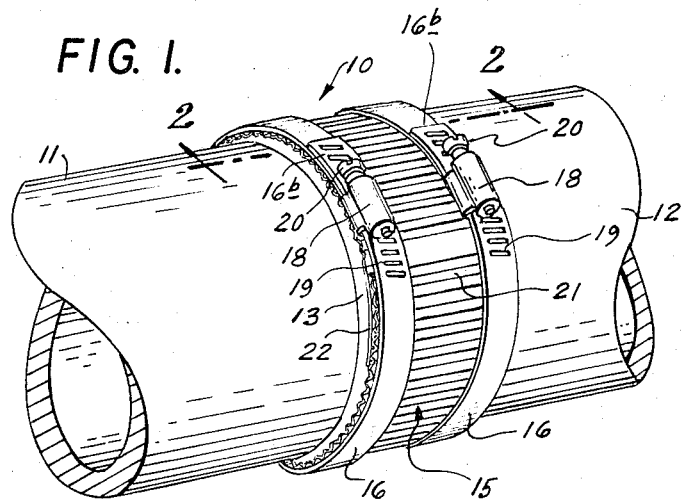
FIG. 1 is a perspective view of a pipe coupling embodying this invention and which is shown joining two pipe sections in end-to-end relation.
Figure 2:
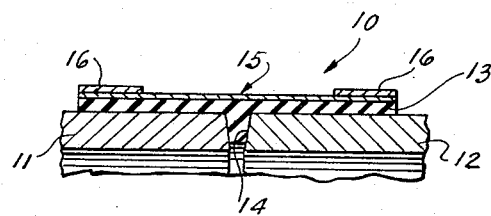
FIG. 2 is an enlarged sectional view taken along the line 2—2 on FIG. 1.

Referring to the drawings in detail, and initially to FIG. 1 thereof, it will be seen that a pipe coupling 10 embodying this invention is there shown joining two pipe sections 11 and 12 in end-to-end relation. The coupling 10 is of the type that generally comprises an annular gasket 13 of natural or synthetic rubber or other suitable elastic material which extends over and bridges the adjacent end portions of pipe sections 11 and 12 and may include a centrally located, internal annular flange 14 (FIG. 2) for engagement between the ends of the pipe sections. A shield 15 encircles gasket 13 and is circumferentially contractable, that is, adapted to have its effective diameter reduced to radially compress the gasket against pipe sections 11 and 12; and clamping bands 16 extend around shield 15 to circumferentially contract the latter upon tightening of the clamping bands.

Figure 3:
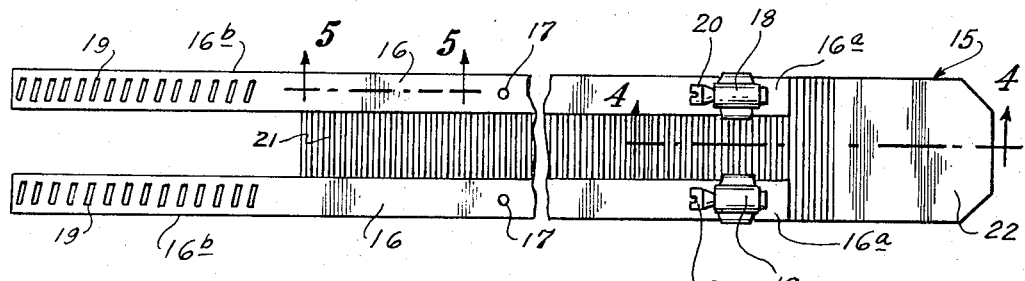
FIG. 3 is a plan view of an assembly of the shield and clamping bands forming part of the coupling of FIG. 1, and which is shown in a fully opened or flat condition.
Figure 7:
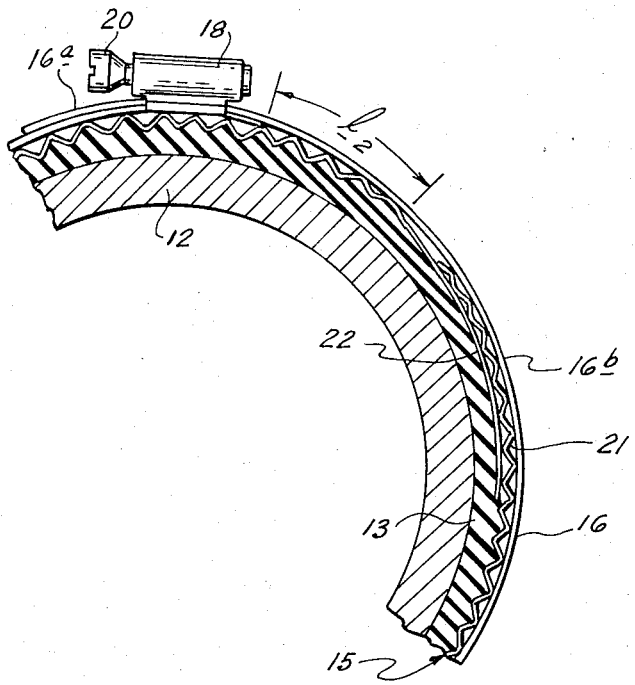
FIG. 7 is a fragmentary enlarged sectional view of the coupling applied to the pipe sections and which is taken in a plane normal to the axis thereof.

As shown particularly in FIG. 3, shield 15 is constituted by an elongated strip of transversely corrugated semi-stiff, flexible sheet material, for example, stainless sheet steel or other resilient metal having the strength and corrosion resistance required, and such strip is longitudinally dimensioned to have its ends in overlapping relation when wrapped around gasket 13. The tightening bands 16, which may also be formed of stainless sheet steel or other resilient metal having the requisite strength and corrosion resistance, extend along the opposite longitudinal edge portions of shield strip 15 and are suitably secured to the latter, as by rivets 17 located intermediate the ends of the bands. In order to effect tightening of bands 16 around shield 15, a screw-type tightening device 18 is suitably fixed to one end portion 16a of each clamping band is adapted to receive the opposite end portion 16b of the respective band which is provided with a series of spaced, obliquely arranged slots 19. Screws 20 are rotatably supported in devices 18 and spaced upwardly a small distance from the respective band end portions 16a so that the slotted end portions 16b can extend through units 18 in overlapping relation to end portions 16a for engagement of the inclined slots 19 by the threads of screws 20. Thus, screws 20, when rotated, draw end portions 16b of the bands through devices 18 and circumferentially displace band portions 16b in the counterclockwise direction, as viewed on FIG. 7, relative to band portions 16a, thereby to circumferentially contract or tighten bands 16 around shield 15.

In accordance with this invention, the lapping or outer end 21 of shield 15 leads over the lapped or inner end 22 thereof in the direction of circumferential displacement imparted by tightening devices 18 to the portions of bands 16 engaging the lapping end 21. Thus, as viewed on FIG. 7, lapping end 21 of shield 15 leads in the counterclockwise direction over lapped end 22 so that, when band portions 16b engaging lapping end 21 are circumferentially displaced in the counterclockwise direction to contract bands 16, lapping end 21 of the shield is similarly circumferentially displaced in the counterclockwise direction relative to lapped end 22 to contract shield 15 so that it will compress and seal gasket 13 against the pipe ends. Since lapping end 21 and band portions 16b engaging the same are circumferentially displaced in the same direction upon contraction of bands 16 and shield 15, there is no relative sliding movement at the contacting surfaces of lapping end 21 and band portions 16b, whereby the frictional resistance to contraction of the shield upon the gasket is substantially reduced.

Figure 4:
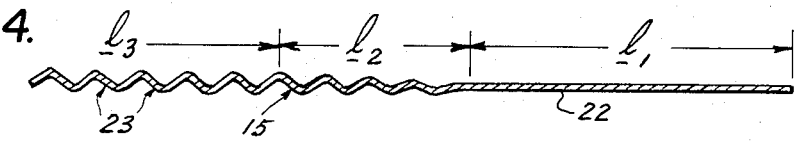
FIG. 4 is an enlarged detail sectional view taken along the line 4—4 on FIG. 3.

Further, in accordance with this invention, the lapped end 22 of shield 15 is flat or smooth on both sides (FIGS. 3, 4 and 7) for a length $l_1$ at least as large as the maximum circumferential overlap of ends 21 and 22 of shield 15 to be encountered when coupling 10 is in use. The remainder of shield 15 is formed with transverse corrugations 23 which extend axially of the pipe sections when coupling 10 is applied thereto. Such corrugations impart resistance to transverse bending forces so that tightening of bands 16 around the ends of the shield causes radial compression of the regions of the gasket 13 underlying bands 16 and also in the region of the gasket between the clamping bands. The corrugations 23 may also flex to accommodate variations in the diameters or contours of the pipe sections joined by the coupling.

Figure 5:
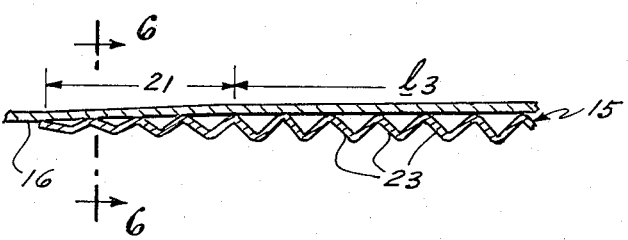
FIG. 5 is an enlarged detail sectional view taken along the line 5—5 on FIG. 3.
Figure 6:
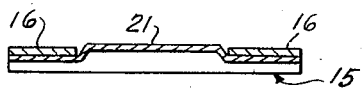
FIG. 6 is a transverse sectional view taken along the line 6—6 on FIG. 5.

As shown, the corrugations 23 in the shield portion $l_2$ (FIG. 4) which connects flat lapped end 22 to the body $l_3$ of the shield progressively decrease in height or taper in the direction toward flat end 22. Similarly the corrugations in the opposite or lapping end 21 (FIG. 5) of shield 15 progressively decrease in height or taper in the direction toward the adjacent strip end edge in the areas of lapping end 21 which are engaged by bands 16. Preferably, as shown particularly on FIG. 6, the corrugations in lapping end 21 are of undiminished height between bands 16, that is, of the same height as the corrugations in the body $l_3$ of the shield, so that the transverse rigidity of shield 15 at its lapping end 21 between bands 16 is not substantially affected by reason of the tapering height of the parts of such corrugations which extend under the clamping bands. The corrugations 22 over the length $l_3$ between part $l_2$ and end portion 23 are preferably of uniform height.

As shown on FIG. 3, bands 16 are secured to the strip constituting shield 15 with flat lapped end 22 of the latter extending substantially beyond end portions 16a of the clamping bands, and with end portions 16b of the bands extending substantially beyond lapping end 21. Thus, when coupling 10 is assembled on pipe sections to be joined thereby, the ends 21 and 22 of its shield 15 overlap in a region or zone that is circumferentially spaced from the zone where end portions 16a and 16b of bands 16 are overlapped. The foregoing makes it possible to lead lapping end 21 over lapped end 22 in the direction of circumferential displacement imparted to band portions 16b engaging lapping end 21 upon contraction of bands 16, to reduce the frictional resistance to contraction of the shield, as previously described. Further, since the lapped end 22 of the shield is flat, there is no possibility that the corrugations in the outer or lapping end 21 will interlock therewith or otherwise prevent the relative sliding movement of the overlapped ends 21 and 22 required to translate the tightening of bands 16 into increasing radial compression of gasket 13.

It will also be seen that by reason of the tapering or progressively decreasing heights of the corrugations in shield portion $l_2$ and in lapped end 21, only relatively gradual changes occur in the effective thickness of the shield about the gasket. The bands 16 can adapt readily to such gradual changes in the thickness of shield 15 so that the radial sealing pressure produced on gasket 13 by the contraction of bands 16 is distributed evenly about the gasket.

Since the corrugations in the part of lapping shield end 21 lying between bands 16 are of undiminished height, that part of shield end 21 has substantially the same resistance to transverse bending forces as the body $l_3$ of the shield, and thus can avoid outward buckling of the edge of shield end 21 due to the outward pressure exerted there by the gasket when it is under heavy radial compression at the locations of the bands.

Thus, the shield 15 in accordance with this invention is effective to efficiently translate circumferential tightening of clamping bands 16 into radial compression of gasket 13 against pipe sections 11 and 12, thereby to tightly seal the joint between the pipe sections and to strongly resist axial removal or pull-out of the pipe sections from the coupling.

Although an illustrative embodiment of the invention has been described in detail herein with reference to the accompanying drawings, it is to be understood that the invention is not limited to that precise embodiment, and that various changes and modifications may be effected therein by one skilled in the art without departing from the scope or spirit of the invention as defined in the appended claims.

What is claimed is:

1. An improved pipe coupling of the type comprising an annular gasket to fit over adjacent pipe ends, a shield of corrugated sheet material to encompass said gasket with ends of the shield overlapping, the shield corrugations extending in axial direction, and clamping means including bands encircling said shield at axially spaced locations thereon and each carrying on one end portion of the band a tightening device receiving and for drawing the other end of the band therethrough in lapping relation to said one end whereby the bands are contractible circumferentially to contract the shield so that it will compress and seal the gasket against the pipe ends, wherein the lapping end of said shield leads over the lapped end thereof in the direction in which said other ends of the bands lap over said one ends of the bands, and said bands are fixed on said shield with said other ends of the bands extending substantially beyond said lapping end of the shield and with said lapped end of the shield extending substantially beyond said one ends of the bands, whereby to substantially reduce the frictional resistance of contacting bands and shield surfaces to contraction of the shield upon the gasket on the pipe ends.

2. A pipe coupling according to claim 1, the lapped end of said shield being substantially flat whereby interlocking of the overlapping ends of the shield is avoided.

3. An improved pipe coupling of the type comprising an annular elastic gasket to fit over adjacent pipe ends, a shield of corrugated sheet material to encompass said gasket with ends of the shield overlapping, the shield corrugations extending in axial direction, and clamping means including bands encircling said shield at axially spaced locations thereon and having tightenable means whereby the bands are contractible circumferentially to contract the shield so that it will compress and seal the gasket against the pipe ends, wherein the lapping end of said shield leads leads over the lapped end thereof in the direction of the circumferential displacement imparted by said tightenable means to the portions of said bands engaging said lapping end to substantially reduce frictional resistance of contacting band and shield surfaces to contraction of the shield upon the gasket on the pipe ends, said lapped end of the shield is substantially flat to avoid interlocking of the overlapping ends of the shield, and said lapped end is connected with the body of said shield through a tapered shield portion formed by corrugations of progressively increasing height and said lapping end of the shield is oppositely tapered by corrugations of progressively diminishing height in areas thereof engaged by said bands, whereby radial sealing pressure is distributed substantially evenly about said gasket upon contraction of said bands.

4. A pipe coupling according to claim 3, said lapping end being formed between said areas with corrugations of substantially the same height as those forming the body of said shield, to prevent outward buckling of the shield ends by pressure of said gasket in the region between said bands.

5. An improved pipe coupling of the type comprising an annular elastic gasket to fit over adjacent pipe ends, a shield of corrugated sheet metal to encompass said gasket with ends of the shield overlapping, the shield corrugations extending in axial direction, and clamping means for contracting the shield circumferentially so that it will compress and seal the gasket against the pipe ends, said clamping means including bands fixed to and encircling the shield at axially spaced locations thereon and tightening devices carried by the bands at one end thereof to one side of the region of overlap of the shield ends for receiving and drawing therethrough the other ends of the bands, wherein the lapping end of said shield leads over the lapped end thereof in the direction in which the portions of said bands contiguous thereto lead toward said other ends of the bands, said lapped end being substantially flat and being connected with the body of said shield through a tapered shield portion formed by corrugations of progressively increasing height, said lapping end being oppositely tapered by corrugations of progressively diminishing height in areas thereof engaged by said bands and being formed between said areas with corrugations of substantially the same height as those of said body.

References Cited

UNITED STATES PATENTS 3,233,922  2/1966  Evans _____ 285—231

EDWARD C. ALLEN, *Primary Examiner.*

T. F. CALLAGHAN, *Assistant Examiner.*